No. 887,824.
L. V. LOCHNER.
AUTOMOBILE GEARING.
APPLICATION FILED OCT. 14, 1907.
PATENTED MAY 19, 1908.
2 SHEETS—SHEET 1.
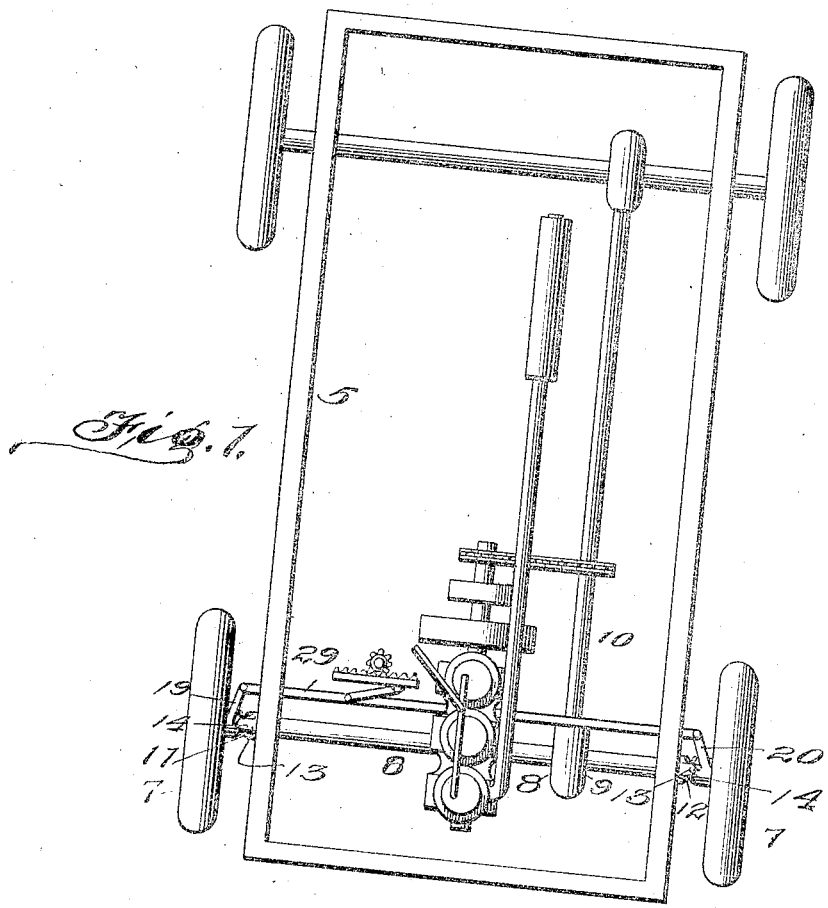
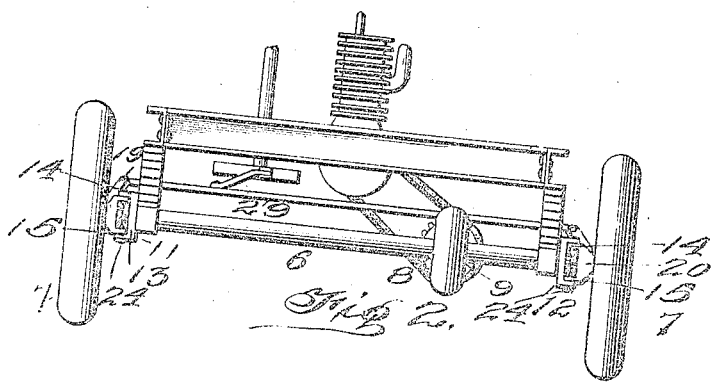

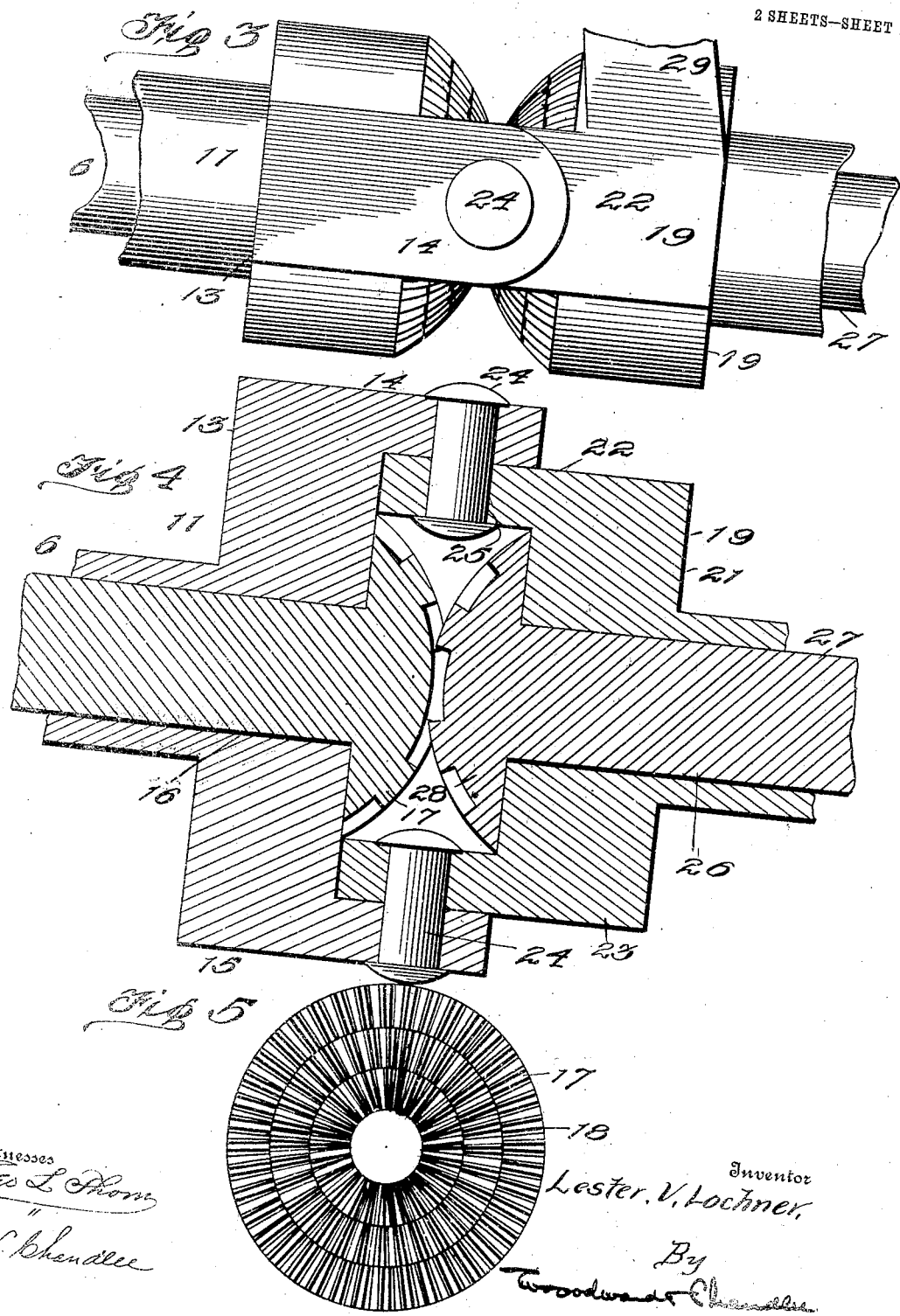

UNITED STATES PATENT OFFICE.

LESTER V. LOCHNER, OF AUBURN, INDIANA.

AUTOMOBILE-GEARING.

No. 887,824.  Specification of Letters Patent.  Patented May 19, 1908.

Application filed October 14, 1907. Serial No. 397,383.

*To all whom it may concern:*

Be it known that I, LESTER V. LOCHNER, a citizen of the United States, residing at Auburn, in the county of Dekalb and State of Indiana, have invented certain new and useful Improvements in Automobile-Gearing, of which the following is a specification.

This invention relates to gearing, and more particularly to automobile gearing, and has for its object to provide a gearing of this character with a novel means for changing the relative angle of the forward wheels of the automobile with respect to the driven shaft.

Other objects and advantages will be apparent from the following description and it will be understood that changes in the specific form shown and described may be made within the scope of the claims without departing from the spirit of the invention.

In the drawings forming a part of this specification, and in which like numerals of reference indicate similar parts in the several views, Figure 1 is a top plan view of a portion of an automobile showing my invention applied thereto, Fig. 2 is a front elevation, Fig. 3 is a detail top plan view of the gearing, Fig. 4 is a vertical longitudinal section, Fig. 5 is a face view of one of the gears.

Referring now more particularly to the drawings, there is shown an automobile 5, including a forward driven axle 6, and the wheels 7 therefor. The axle 6 is provided with a gear 8 and this gear meshes with a gear 9 mounted upon a drive shaft 10. Mounted upon the ends of the axle 6, there are shown yokes 11 and 12 respectively, and these yokes consist of the vertically extending portions 13 and the horizontally and outwardly extending portions 14 and 15. The portion 13 of each yoke 8 and 9 is provided with a horizontally extending passage 16 and through this passage there is passed the ends of the driven axle 6.

Substantially hemispherical gear wheels 17 are formed upon the shaft 6 and outwardly of the portions 13 of the yokes 11 and 12 and these gears are thus disposed between the portions 14 and 15 of the yoke. The gear wheels 17 are provided upon their hemispherical faces with gear teeth 18, and these gear teeth are preferably arranged in rows around the faces of the gears, and the teeth of each row being arranged alternate to those in the preceding row.

Yokes 19 and 20 are pivoted to the yokes 11 and 12, and these yokes consist of the vertically extending portions 21, and the upper and lower horizontally extending portions 22 and 23, and these portions 22 and 23 are arranged to lie inwardly of and beneath the portions 14 and 15 of the yokes 11 and 12. A pivot bolt 24 is disposed through passages 25 in the respective yokes for pivotal movement. The vertical portions 21 of the yokes 19 and 20 are provided with horizontally extending passages 26 and these passages are arranged to lie in line with the passages 16 formed in the portion 13 of the yokes 11 and 12. Shafts 27 are arranged in the passages 26, and these shafts carry at their inner ends, gear wheels 28 which are similar to the gears 17, and are thus arranged to mesh therewith. The shafts 27 are thus arranged to support the wheels 7 of the automobile.

The usual steering rods 29 are connected with the yokes 19 and 20 by means of which the front wheels of the vehicle may be turned at the desired angle.

What is claimed is;

A gearing of the class described, comprising a drive-shaft, a driven shaft geared thereto, the driven shaft having yokes secured at its outer ends, the yokes comprising vertically extending portions and outwardly and horizontally extending portions at the upper and lower ends thereof, the driven shaft having hemispherical gears at the outer ends, the teeth of the gears being arranged in circumferential rows upon the hemispherical faces, the teeth of the alternate rows being arranged between the teeth of the opposite rows, a second yoke mounted for angular movement with respect to the first yoke, the yoke having a shaft, a hemispherical gear carried by the shaft and arranged to mesh with the first named gear, and a steering apparatus connected with the last named yokes.

In testimony whereof I affix my signature, in presence of two witnesses.

LESTER V. LOCHNER.

Witnesses:
SILAS J. BRANDON,
C. V. BRANDON